United States Patent
Frazier et al.

(10) Patent No.: US 11,428,708 B2
(45) Date of Patent: Aug. 30, 2022

(54) DETECTION OF POLYETHYLENE AND SILICON OR OTHER MATERIAL COMBINATIONS USED IN MOTION SENSORS OR OTHER DEVICES

(71) Applicant: Raytheon Company, Waltham, MA (US)

(72) Inventors: Gary A. Frazier, Garland, TX (US); Randy L. Gann, Lewisville, TX (US)

(73) Assignee: Raytheon Company, Waltham, MA (US)

( * ) Notice: Subject to any disclaimer, the term of this patent is extended or adjusted under 35 U.S.C. 154(b) by 59 days.

(21) Appl. No.: 16/932,030

(22) Filed: Jul. 17, 2020

(65) Prior Publication Data

US 2022/0018871 A1    Jan. 20, 2022

(51) Int. Cl.
*G01P 13/00*    (2006.01)
*G01N 21/65*    (2006.01)
*G01V 8/10*    (2006.01)
*G08B 13/19*    (2006.01)

(52) U.S. Cl.
CPC .............. *G01P 13/00* (2013.01); *G01N 21/65* (2013.01); *G01V 8/10* (2013.01); *G08B 13/19* (2013.01)

(58) Field of Classification Search
CPC ............. G01P 13/00; G01N 21/65; G01J 3/44
See application file for complete search history.

(56) References Cited

U.S. PATENT DOCUMENTS

| 7,969,576 B1 | 6/2011 | Buckley et al. |
| 2004/0051867 A1* | 3/2004 | Brestel ................. G01J 3/2889 356/318 |
| 2010/0242572 A1 | 9/2010 | Yu |

FOREIGN PATENT DOCUMENTS

| CN | 212254401 U | * 12/2020 |
| WO | 2016/162461 A1 | 10/2016 |

OTHER PUBLICATIONS

Horiba Scientific, "How to do a Raman spectrum" https://www.youtube.com/watch?v=0UVWIcNHaxE, 2014 (Year: 2014).*
Tsuchida et al., "Identification of Shredded Plastics in milliseconds using Raman Spectroscopy for Recycling", IEEE Sensors 2009 Conference, Oct. 2009, 4 pages.
Ibrahim et al., "Classification of polyethylene by Raman spectroscopy", ThermoFisher Scientific, 2017, 6 pages.

(Continued)

*Primary Examiner* — Maurice C Smith

(57) ABSTRACT

A method includes transmitting first optical energy towards a space being scanned. The method also includes detecting one or more instances of a first material in the space using first return optical energy, where the first return optical energy is based on the transmitted first optical energy. The method further includes, for each of the one or more instances of the first material, transmitting second optical energy towards a portion of the space in which the instance of the first material was detected. The method also includes detecting one or more instances of a second material in the space using second return optical energy, where the second return optical energy is based on the transmitted second optical energy. In addition, the method includes identifying a presence of at least one type of device in the space based on instances of the first and second materials detected in the space.

21 Claims, 5 Drawing Sheets

(56) References Cited

OTHER PUBLICATIONS

Deschaines et al., "Characterization of Amorphous and Microcrystalline Silicon using Raman Spectroscopy", Thermo Scientific, 2009, 3 pages.
Owen, "Uses of Derivative Spectroscopy", Agilent Technologies, 1995, 8 pages.
Noah, "Raman Spectra of Silicon, Experiment #6, Characterization of Materials (96.445/545)", Oct. 2010, 6 pages.
"Raman Spectroscopy", Advanced Physics Laboratory, Feb. 2006, 6 pages.
Burnside, "Remote sensing plastics", Nature Sustainability, vol. 1, Oct. 2018, 1 page.
Garaba et al., "Sensing Ocean Plastics with an Airborne Hyperspectral Shortwave Infrared Imager", Environmental Science & Technology, Sep. 2018, 9 pages.
Rieker, "Wavelength-Modulation Spectroscopy for Measurements of Gas Temperature and Concentration in Harsh Environments", Thesis, Stanford University, May 2009, 163 pages.
"Guide to the identification of microplastics by FTIR and Raman spectroscopy", ThermoFisher Scientific, 2018, 6 pages.

\* cited by examiner

DETECTION OF POLYETHYLENE AND SILICON OR OTHER MATERIAL COMBINATIONS USED IN MOTION SENSORS OR OTHER DEVICES

TECHNICAL FIELD

This disclosure is generally directed to detection systems. More specifically, this disclosure is directed to the detection of polyethylene and silicon or other material combinations used in motion sensors or other devices, such as in passive infrared motion sensors or other surveillance devices.

BACKGROUND

Passive infrared motion sensors have become ubiquitous in today's society. These motion sensors are typically used to initiate electronic actions in response to detected motions of warm objects. For example, security systems routinely used in homes and businesses often rely on motion sensors to determine whether people are moving in unauthorized or restricted areas, and automatic doors routinely used in stores and buildings often rely on motion sensors to detect people approaching the doors. However, motion sensors may be used for much more nefarious purposes, as well. For instance, motion sensors may be used to trigger explosives in buildings or along roadsides in response to detected motions.

SUMMARY

This disclosure provides for the detection of polyethylene and silicon or other material combinations used in motion sensors or other devices.

In a first embodiment, a method includes transmitting first optical energy towards a space being scanned. The method also includes detecting one or more instances of a first material in the space using first return optical energy, where the first return optical energy is based on the transmitted first optical energy. The method further includes, for each of the one or more instances of the first material, transmitting second optical energy towards a portion of the space in which the instance of the first material was detected. The method also includes detecting one or more instances of a second material in the space using second return optical energy, where the second return optical energy is based on the transmitted second optical energy. In addition, the method includes identifying a presence of at least one type of device in the space based on instances of the first and second materials detected in the space.

In a second embodiment, a system includes at least one optical source configured to generate first optical energy for transmission towards a space being scanned. The system also includes at least one receiver configured to receive first return optical energy, where the first return optical energy is based on the transmitted first optical energy. The system further includes at least one processor configured to detect one or more instances of a first material in the space using the first return optical energy. For each of the one or more instances of the first material, the at least one optical source is configured to generate second optical energy for transmission towards a portion of the space in which the instance of the first material was detected. The at least one receiver is configured to receive second return optical energy, where the second return optical energy is based on the transmitted second optical energy. The at least one processor is configured to detect one or more instances of a second material in the space using second return optical energy and identify a presence of at least one type of device in the space based on instances of the first and second materials detected in the space.

In a third embodiment, a non-transitory computer readable medium includes instructions that when executed cause at least one processor to initiate transmission of first optical energy towards a space being scanned. The medium also includes instructions that when executed cause the at least one processor to detect one or more instances of a first material in the space using first return optical energy, where the first return optical energy is based on the transmitted first optical energy. The medium further includes instructions that when executed cause the at least one processor, for each of the one or more instances of the first material, to initiate transmission of second optical energy towards a portion of the space in which the instance of the first material was detected. The medium also includes instructions that when executed cause the at least one processor to detect one or more instances of a second material in the space using second return optical energy, where the second return optical energy is based on the transmitted second optical energy. In addition, the medium includes instructions that when executed cause the at least one processor to identify a presence of at least one type of device in the space based on instances of the first and second materials detected in the space.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
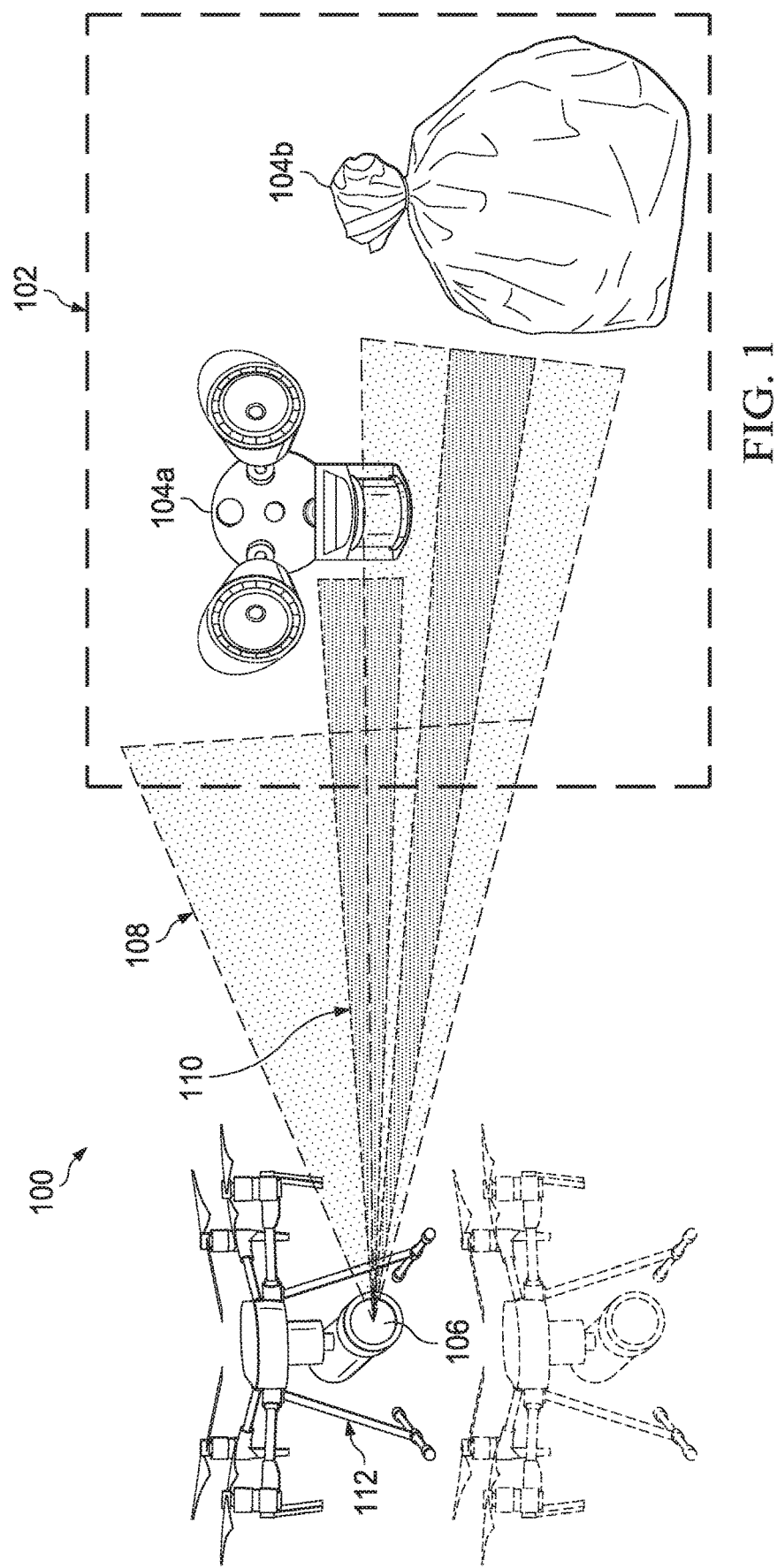
FIG. 1 illustrates an example environment in which detection of polyethylene and silicon or other material combinations used in motion sensors or other devices may be supported in accordance with this disclosure.

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, passive infrared motion sensors can be used to initiate electronic actions in response to detected motions of warm objects. Unfortunately, while often used in benign devices and systems (such as security systems and motion-sensitive doors), motion sensors may be used for much more nefarious purposes (such as triggering explosives). Many motion sensors routinely include the same types of components for detecting motion, namely a polyethylene Fresnel lens and a silicon or silicon-based window that are positioned between a scene and a physical sensor. The physical sensor itself may represent a pyroelectric-type detector that includes silicon-based material. The physical sensor is typically sensitive to a specific wavelength range of infrared energy. The lens and window typically pass the wavelengths of that specific wavelength range while possibly blocking other wavelengths.

Given this, it might be possible to identify the presence of one or more devices in a specified space by detecting the presence of certain combinations of materials used in those devices within the space, such as by detecting polyethylene (lenses) and silicon or silicon-based materials (windows/detectors) often used in motion sensors. However, plastic polymers like polyethylene are extremely common in numerous environments, meaning an environment in which scanning may occur will often be highly "cluttered." Moreover, the detection of a second material behind a first material often requires a long "dwell time" of a sensor at a specific location, meaning the sensor needs to remain fixedly pointed at that specific location for an extended period of time (often several seconds or more) in order to achieve a desired false negative or false positive detection rate. As a result, scanning a large space for one or more specific combinations of materials can be extremely difficult at best.

This disclosure provides various approaches for detecting one or more specific combinations of materials in a given environment. For example, these approaches may be used to quickly identify where silicon or silicon-based material is positioned behind or otherwise near polyethylene, which may be indicative of the presence of a motion sensor in the given environment. In general, these approaches can be used to detect the presence of multiple materials at substantially the same location in space. As described in more detail below, these approaches provide for fast detection of a first or covering material (such as polyethylene in a lens) and then use detection events associated with detections of the covering material as cues to scrutinize certain locations for a second or target material (such as silicon or silicon-based material in a window or detector). These approaches can dramatically increase the detection rate and reduce the false positive or false negative rate when attempting to identify motion sensors or other devices in the space.

In some embodiments, Raman or derivative spectroscopy may be used to quickly detect the covering material with high sensitivity in a given space, and Raman or derivative spectroscopy may then be used while dwelling on the covering material in order to detect the presence of the target material behind the covering material. Raman spectroscopy generally involves transmitting optical energy at one or more wavelengths from an optical probe and (for each material illuminated by the optical energy) receiving return optical energy having a Raman signature. Different materials have different Raman signatures that result from scattering of the transmitted optical energy by different molecules in the materials, so the return optical energy can be analyzed in order to identify one or more materials being illuminated by the transmitted optical energy. Derivative spectroscopy generally involves transmitting optical energy at one or more wavelengths from an optical probe and (for each material illuminated by the optical energy) receiving return optical energy. The return optical energy has a signal that is proportional to a derivative (such as a first derivative) of the reflectance and transmission properties of the illuminated material, or more specifically a signal that is proportional to the derivative of reflectance and transmittance versus wavelength. As a result, the return optical energy can be analyzed in order to identify one or more materials being illuminated by the transmitted optical energy. Using Raman or derivative spectroscopy (or some other suitable spectroscopic approach now known or later developed), it is possible to identify different materials in a scene, thereby allowing for the identification of specific combinations of materials in the scene. In either Raman or derivative spectroscopy, multiple wavelengths can also be used to help discriminate between different materials in the scene.

Among other uses, these detection approaches enable the detection of motion sensors without actually triggering the motion sensors. In other words, the motion sensors can be detected without the motion sensors actually sensing any movement, which can be highly beneficial when the motion sensors are used for nefarious purposes. These detection approaches also help to reduce or avoid the use of specular scattering from the target material, since these approaches can be based on wavelengths offset from the optical probe. In addition, these detection approaches can significantly suppress clutter in a space being scanned, which can reduce the amount of time needed to scan the space for motion sensors or other devices and can achieve significantly improved performance. In some cases, dwell times can be reduced by a factor of up to one thousand or more when detecting the presence of silicon in a large room. As described below, these detection approaches can be implemented in a number of ways, such as for use in land or air vehicles or for use in a handheld manner.

FIG. 1 illustrates an example environment 100 in which detection of polyethylene and silicon or other material combinations used in motion sensors or other devices may be supported in accordance with this disclosure. As shown in FIG. 1, the environment 100 includes or represents at least one space 102 in which various objects may be present. Each space 102 represents any suitable physical space to be scanned in order to detect one or more specific material combinations, which may be indicative of one or more specific types of devices being located within the space 102. As particular examples, the space 102 may represent a room, a building, or a roadside to be scanned.

In this example, the objects shown within the space 102 include a motion sensor 104a and a garbage bag 104b. The motion sensor 104a generally represents a device configured to sense motion of at least one warm object within at least part of the space 102. As discussed above, the motion sensor 104a may include a polyethylene lens and a silicon or silicon-based window positioned between a scene and a physical sensor. The physical sensor itself may represent a pyroelectric-type detector that includes silicon-based material. The garbage bag 104b contains unknown contents (at least relative to a person or group wishing to inspect the space 102) and may itself contain a motion sensor. The material forming standard garbage bags is often transparent or substantially transparent to infrared wavelengths or other wavelengths used by motion sensors to detect movement, meaning the garbage bag 104b might be used to conceal a fully-functional motion sensor. Note that these two examples of objects in a space 102 to be scanned are for illustration only and that any other or additional types of objects may be present in the space 102 to be scanned.

At least one material sensor 106 is used to scan the space 102 looking for one or more specific combinations of materials in the space 102. The presence of the specific combination(s) of materials in the space 102 can be used as an indicator for the presence of one or more specific types of devices of interest in the space 102. As described in more detail below, each material sensor 106 can transmit optical energy 108 towards an object or other portion of the space 102 and use Raman, derivative, or other spectroscopy based on return optical energy from the object or other portion of the space 102 to identify whether a first material (such as a covering material) is present. If the first material is located, each material sensor 106 can transmit optical energy 110 towards the portion of the object or space 102 in which the first material was detected and use Raman, derivative, or other spectroscopy based on return optical energy from the object or other portion of the space 102 to identify whether a second material (such as a target material) is present.

As a particular example of this, a material sensor 106 may transmit the optical energy 108 and use Raman, derivative, or other spectroscopy based on return optical energy in order to identify one or more instances of polyethylene being present in the space 102. Each detected instance of the polyethylene represents the potential presence of a polyethylene lens of a motion sensor, but the presence of a motion sensor cannot be confirmed yet since polyethylene is a widely-used material. Thus, for each detected instance of polyethylene, the material sensor 106 may then transmit the optical energy 110 towards the portion of the object or space 102 in which the polyethylene was detected and use Raman, derivative, or other spectroscopy based on return optical energy in order to identify one or more instances of silicon or silicon-based material being present in the space 102. Each detected instance of the silicon or silicon-based material represents the potential presence of a window or detector of a motion sensor. The combination of detecting polyethylene and then detecting silicon or silicon-based material at the same general location in the space 102 may indicate the likely presence of a motion sensor at that location.

Essentially, each material sensor 106 here operates to detect a first material (such as a covering material) at one or more locations in the environment 100 and then to focus attention on the one or more locations in order to determine whether a second material (such as a target material) is present. If both materials are detected at or near the same location in the environment 100, this may be indicative of a specific type of device being present at that location. If such a material combination is detected, any suitable action can occur, such as the transmission of one or more notifications to personnel identifying the location(s). Note, however, that any other or additional actions may occur.

In the specific example shown in FIG. 1, the material sensor 106 is carried by a drone or other unmanned aerial vehicle (UAV) 112. The use of the UAV 112 may allow, for example, the material sensor 106 to be carried into or near a room, into or near a building, or over a roadside to identify any possible instances of motion sensors or other objects of interest in the space 102. As a particular example, the UAV 112 may be used to position the material sensor 106 immediately outside a window of a room so that the material sensor 106 can determine whether any motion sensors are detected in the room (and without triggering any motion sensors that might be present in the room). Note, however, that the material sensor 106 may be carried by, integrated into, or otherwise used with any other suitable systems, various examples of which are provided below.

Although FIG. 1 illustrates one example of an environment 100 in which detection of polyethylene and silicon or other material combinations used in motion sensors or other devices may be supported, various changes may be made to FIG. 1. For example, at least one material sensor 106 may be used to scan any suitable space 102 in any suitable environment 100, and the space 102 may include any suitable number(s) and type(s) of objects. Also, the detection of motion sensors containing polyethylene lenses and silicon or silicon-based windows or detectors represents one specific example of the type of material combination that might be sought during a scan using a material sensor 106. However, any other suitable material combination(s) may be searched for during one or more scans of at least one given space 102 using at least one material sensor 106. Other examples of materials that might sensed can include polypropylene, polystyrene, polytetrafluoroethylene, or other polymers or other materials used to form a lens or other portion of a motion sensor or other device. Still other examples of materials that might be sensed can include germanium or other materials used to form a window, detector, or other portion of a motion sensor or other device.

It is also possible, without significant changes to the detection process, to physically separate the transmitters and receivers associated with the first and second detection processes. For example, two vehicles 112 may be used, where the first vehicle 112 operates as the first detection system and a second vehicle 112 operates as a second detection system. Communications between the vehicles 112 can then be used to provide a location map from the first detection scan to cue the second vehicle 112 to focus attention on specific locations in an environment. Alternatively, one vehicle 112 may operate as the transmitter in both the first and second detection processes, while a second vehicle 112 operates as the receiver in both first and second detection processes. Communications between the vehicles 112 can then be used to coordinate the transmission and receiving processes so that the two vehicles 112 act as a cooperative, bi-static detection system. This may be useful in various situations, such as when one vehicle 112 is capable of carrying a greater fraction of the weight or processing capability of the detection system while the other vehicle 112 is capable of moving around in the environment with a smaller fraction of the system components.

Figure 2:
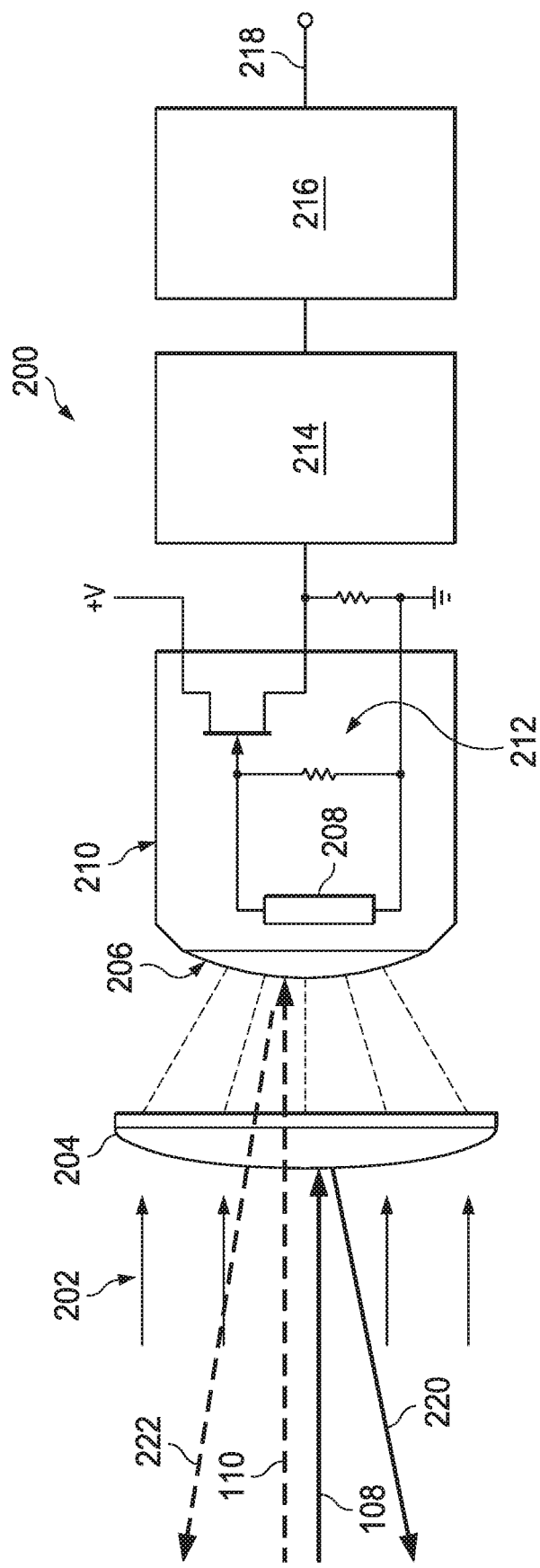
FIG. 2 illustrates an example motion sensor in which polyethylene and silicon or other material combinations can be detected in accordance with this disclosure.

FIG. 2 illustrates an example motion sensor 200 in which polyethylene and silicon or other material combinations can be detected in accordance with this disclosure. The motion sensor 200 may, for example, represent a motion sensor 104a or a motion sensor hidden in a garbage bag 104b in the space 102 of FIG. 1. However, the motion sensor 200 may be used in any other suitable environment with or without concealment.

As shown in FIG. 2, the motion sensor 200 operates to receive thermal energy 202 and sense when the thermal energy 202 is indicative of at least one warm object (such as a person or vehicle) moving within the motion sensor's field of view. A lens 204 (such as a Fresnel lens) focuses the incoming thermal energy 202 so that the thermal energy 202 passes through a window 206 and reaches a physical sensor 208. As discussed above, the lens 204 may (but need not) be formed from polyethylene, and the window 206 may (but need not) be formed from a silicon or silicon-based material. The physical sensor 208 may also represent a pyroelectric-type detector or any other sensor that can detect the thermal energy 202 that passes through the lens 204 and window 206. The physical sensor 208 captures or generates measurements associated with the thermal energy 202 striking the physical sensor 208. The physical sensor 208 is located within a housing 210, which can help to prevent stray illumination from striking the physical sensor 208. Outputs of the physical sensor 208 are provided to an analog front-end circuit 212, which operates to pre-process or otherwise condition the outputs for further processing. In this example, the analog front-end circuit 212 includes a transistor coupled to a supply voltage (denoted+V) and to several resistors. The conditioned outputs are provided to an amplifier 214, which amplifies the conditioned outputs. The amplified conditioned outputs are provided to a comparator 216, which compares the amplified conditioned outputs to some threshold value in order to produce final outputs 218 of the motion sensor 200. Overall, these components generally operate to detect when at least one warm object in the motion sensor's field of view is moving, and the final outputs 218 can indicate when this condition is detected. The lens 204 is often embossed or otherwise formed so that motion of a warm object across the field of view of the sensor 208 creates a changing level of illumination at the sensor 208. Motion is therefore translated into time-varying intensity and, through detection, into a time-varying signal that is indicative of motion.

Note that this represents a simplified example of the structure and operation of a motion sensor 200. Motion sensors 200 may have any other suitable configuration, and this disclosure is not limited to any particular implementation of a motion sensor 200. As long as a motion sensor 200 or other device includes at least two materials that can be identified by the material sensor 106 using Raman, derivative, or other spectroscopic technique, the particular implementation of the motion sensor 200 or other device is immaterial.

In FIG. 2, optical energy 108 from a material sensor 106 is shown as striking the lens 204 of the motion sensor 200, which results in the formation of return optical energy 220 having at least one return wavelength. The return optical energy 220 does not represent (or does not only represent) a reflected version of the optical energy 108. Rather, the return optical energy 220 can also or alternatively include one or more wavelengths produced by the interaction of the optical energy 108 with the material forming the lens 204. For example, the return optical energy 220 may include a signal at one or more wavelengths that is proportional to a derivative (such as the first derivative) of the reflectance and transmission properties of the material forming the lens 204. Using derivative spectroscopy, the return optical energy 220 can be analyzed by the material sensor 106 in order to estimate the material composition of the material forming the lens 204. As another example, the return optical energy 220 may include a signal representing the Raman signature of the material forming the lens 204. Using Raman spectroscopy, the return optical energy 220 can be analyzed by the material sensor 106 in order to estimate the material composition of the material forming the lens 204. Using Raman or derivative spectroscopy, multiple wavelengths can be used to help discriminate between different materials in the scene.

One possible advantage of Raman spectroscopy is that the return signal (return optical energy 220) carries information about the composition of the material being illuminated but does not necessarily illuminate the sensor 208 with a wavelength that the sensor 208 can detect. For example, a Raman laser may have a wavelength of 532 nm, which has a photon energy of 2.33 electron volts (eV). After reflection from an object, the return signal may carry a secondary signal at an offset wavelength that indicates the material composition of the object. For instance, a material with an electronic resonance at 10 μm of wavelength can generate a Raman offset signal that is 0.124 eV different in energy than the Raman laser energy. In this example, the return signal would be at 2.33−0.124=2.206 eV, or a wavelength of 562 nm. The return signal indicates the presence of a material with a resonance at 10 μm, but the Raman laser and the return signal are at very different wavelengths. A sensor 208 that detects 10 μm of radiation would not respond to either the Raman laser wavelength or the secondary wavelength, but the process has detected the presence of a sensor with that characteristic.

Similarly, optical energy 110 from the material sensor 106 is shown as passing through the lens 204. The lens 204 here is at least partially transparent to the optical energy 110, which allows at least some of the optical energy 110 to strike the window 206 of the motion sensor 200. This results in the formation of return optical energy 222 having at least one return wavelength. Again, the return optical energy 222 does not represent (or does not only represent) a reflected version of the optical energy 110. Rather, the return optical energy 222 can also or alternatively include one or more wavelengths produced by the interaction of the optical energy 110 with the material forming the window 206. For example, the return optical energy 222 may include a signal at one or more wavelengths that is proportional to a derivative (such as the first derivative) of the reflectance and transmission properties of the material forming the window 206. Using derivative spectroscopy, the return optical energy 222 can be analyzed by the material sensor 106 in order to estimate the material composition of the material forming the window 206. As another example, the return optical energy 222 may include a signal representing the Raman signature of the material forming the window 206. Using Raman spectroscopy, the return optical energy 222 can be analyzed by the material sensor 106 in order to estimate the material composition of the material forming the window 206. Using Raman or derivative spectroscopy, multiple wavelengths can be used to help discriminate between different materials in the scene.

In this way, the presence of the material forming the lens 204 and the presence of the material forming the window 206 can be detected remotely. As a result, the presence of the motion sensor 200 in a given space 102 can be detected based on the materials detected in the space 102. Ideally, this can be accomplished without causing the motion sensor 200 to sense movement.

Although FIG. 2 illustrates one example of a motion sensor 200 in which polyethylene and silicon or other material combinations can be detected, various changes may be made to FIG. 2. For example, other motion sensors may be detected using the approaches described in this patent document. Also, the detection of polyethylene and silicon is one example use of the approaches described here, although other material combinations may also be detected using these approaches. In addition, while the optical energy 110 is shown here as striking the window 206 of the motion sensor 200, the optical energy 110 may also or alternatively strike the physical sensor 208 in order to support detection of a pyroelectric-type or other detector.

Figure 3:
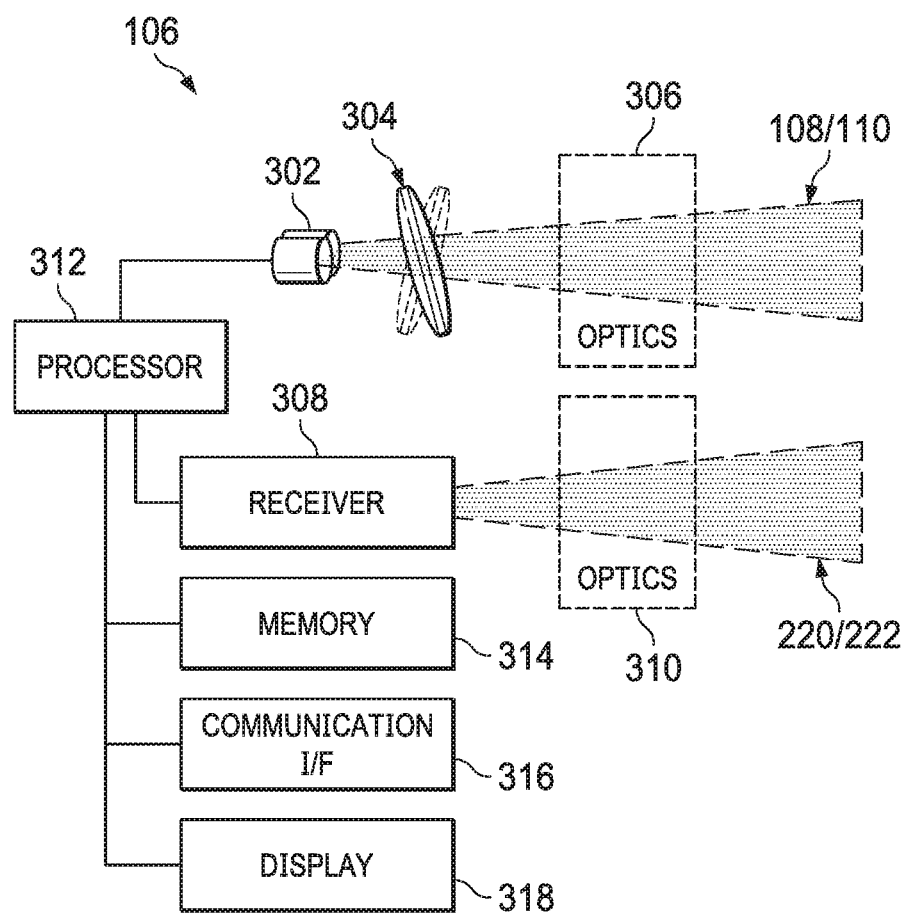
FIG. 3 illustrates an example material sensor for detecting polyethylene and silicon or other material combinations used in motion sensors or other devices in accordance with this disclosure.

FIG. 3 illustrates an example material sensor 106 for detecting polyethylene and silicon or other material combinations in accordance with this disclosure. For ease of explanation, the material sensor 106 shown in FIG. 3 is described as being used in the environment 100 of FIG. 1 to detect the motion sensor 200 of FIG. 2. However, the material sensor 106 may be used in any other suitable environment and to detect any other suitable materials.

As shown in FIG. 3, the material sensor 106 includes at least one optical source 302. The at least one optical source 302 is configured to generate the optical energy 108 and the optical energy 110 that are directed toward at least part of a space 102 in order to detect at least one combination of materials in the space 102. Each optical source 302 includes any suitable structure configured to generate optical energy, such as one or more laser diodes or laser diode arrays. Each optical source 302 is also configured to generate optical energy at any suitable wavelength or wavelengths, and each optical source 302 may or may not be tunable to change the wavelength(s) of laser energy generated by the optical source 302. In some embodiments where the at least one optical source 302 is tunable, the desired tuning for each optical source 302 or multiple optical sources 302 may be achieved via a control signal. The control signal may be provided by a component on the same platform on which the material sensor 106 is located or may come from another device remotely located. Thus, tuning of at least one optical source 302 to change wavelengths of at least one optical signal may be achieved based on the type of material to be detected.

In some embodiments, the material sensor 106 may include multiple optical sources 302, such as when a first optical source 302 can be used to generate the optical energy 108 and a second optical source 302 can be used to generate the optical energy 110. As particular examples, the first optical source 302 may represent a mid-infrared wavelength (MIR) light source that can be used to detect polyethylene, and the second optical source 302 may represent a visible or ultraviolet (UV) light source that can be used to detect silicon or silicon-based material. Note that the use of ultraviolet light may be useful since polyethylene is partially transparent to ultraviolet light, which allows the ultraviolet light to strike the window 206 or other material behind the polyethylene lens 204. In particular embodiments, the optical energy 108 that is produced by the material sensor 106 may represent optical energy in the 3,000 cm$^{-1}$ (3.33 µm) band, and the optical energy 110 that is produced by the material sensor 106 may represent optical energy in the 25,000 to 50,000 cm$^{-1}$ (0.2 to 0.4 µm) band. However, any other suitable source(s) of energy may be used in the material sensor 106, and the specific source or sources of energy can vary based on a number of factors (including the materials of interest). In some embodiments, the material sensor 106 may include multiple individual optical sources 302, and a set of optical sources 302 may be selected for transmitting the optical signal(s) 108 and/or 110 appropriate to facilitate detection of the desired combination(s) of materials.

The optical energy 108 and the optical energy 110 can be modulated by the material sensor 106 in order to support the identification of materials in a space 102. Various approaches may be used to modulate optical energy here. For example, in the illustrated embodiment, an optical interference filter 304 can be vibrated, rotated, or otherwise moved back-and-forth in order to modulate the optical energy 108 and the optical energy 110. Without a loss of generality, consider an interference filter design that has a narrow bandpass characteristic. Tilting an interference filter 304 changes the filtering property of its filter element. In particular, tilting an interference filter 304 away from normal to its optical axis generally shifts the peak bandpass wavelength from the peak passband wavelength at normal incidence. Passing broadband light through a narrow bandpass filter that is fixed in position produces narrowband light that can be used to illuminate the scene. Periodic vibration or tilting of the filter 304 produces a periodically-shifted bandpass and a periodically-shifted illumination wavelength. The combination of a broadband light source and a tilting filter is functionally equivalent to a system that sweeps light of varying wavelength across the scene. In some cases, the first optical source 302 may represent a broadband MIR light source, and the interference filter 304 may represent a narrowband interference filter. In these embodiments, the interference filter 304 can help to produce a narrowband beam of energy as the optical energy 108. In other embodiments, the optical source(s) 302 can be tunable, which allows the optical energy 108 and the optical energy 110 to be modulated as needed by adjusting the operation of the optical source(s) 302. In these latter embodiments, the filter 304 may not be required since the source(s) 302 can provide tunable wavelength diversity.

In this example, one or more optics 306 may be used to direct the optical energy 108 and the optical energy 110 toward an object or other portion of a space 102 being scanned. The one or more optics 306 may include any suitable optical device(s) configured to direct optical energy. For example, the one or more optics 306 may include one or more lenses, one or more mirrors, and/or a telescope.

The return optical energy 220 and the return optical energy 222 generated using the optical energy 108 and the optical energy 110, respectively, are detected at the material sensor 106 using at least one optical receiver 308. The receiver 308 represents any suitable device or devices configured to sense and measure optical energy returning from an object or other portion of a space 102 being scanned. For example, the receiver 308 may include one or more photodiodes or other photodetectors, and multiple photodiodes or other photodetectors (if used) may be arranged in at least one array. The receiver 308 may also include circuitry configured to condition the outputs of the photodiodes or other photodetectors and other circuitry configured to measure various characteristics of the return optical energy 220 and the return optical energy 222 based on the conditioned outputs of the photodiodes or other photodetectors.

In this example, one or more optics 310 may be used to facilitate reception and redirection of the return optical energy 220 and the return optical energy 222 from an object or other portion of a space 102 being scanned. The one or more optics 310 may include any suitable optical device(s) configured to direct optical energy. For example, the one or more optics 310 may include one or more lenses, one or more mirrors, and/or a telescope. Note that while shown separately here, some of the optics 306, 310 may represent components used in both the transmit and receive paths of the material sensor 106.

At least one processor 312 is coupled to the receiver 308 and is configured to receive and process information related to the return optical energy 220 and the return optical energy 222. For example, the processor 312 may use information related to the return optical energy 220 and the return optical energy 222 obtained from the receiver 308 to identify the spectrum of each return optical energy 222 or 222. The processor 312 may also use Raman, derivative, or other spectroscopy to identify the material composition detected by each of the return optical energy 220 or 222 based on that return energy's spectrum. Note that various approaches for processing information in order to identify a specific material represented by a return optical energy 220 or 222 based on Raman or derivative spectroscopy are known, and other spectroscopic approaches are sure to be developed in the future. The processor 312 may use any suitable known or to-be-developed approach for processing information to support Raman, derivative, or other spectroscopic analysis of optical energy to identify material composition. The processor 312 may also be coupled to the optical source(s) 302 and be configured to control the operations of the optical source(s) 302, such as by controlling the initiation of the generation/transmission of the optical energy 108 and the optical energy 110 and controlling the modulation thereof. The at least one processor 312 includes any suitable number(s) and type(s) of processors or other processing devices in any suitable arrangement. Example types of processors 312 include one or more microprocessors, microcontrollers, digital signal processors (DSPs), application specific integrated circuits (ASICs), field programmable gate arrays (FPGAs), or discrete circuitry.

In this example, the processor 312 is coupled to a memory 314, which can be used to store and facilitate retrieval of information (such as data, program code, and/or other suitable information on a temporary or permanent basis). The memory 314 may include a random-access memory or any other suitable volatile or non-volatile storage device(s). The memory 314 may include one or more components or devices supporting longer-term storage of data, such as a read only memory, hard drive, Flash memory, or optical disc.

In some embodiments, the memory 314 may store a database of known optical energy characteristics for different materials that may be scanned in a space 102. The known optical energy characteristics may, for instance, include Raman signatures of known materials or signals proportional to derivatives (such as first derivatives) of reflectance and transmission properties of known materials. The processor 312 may also compare optical energy characteristics for the return optical energy 220 and/or 222 to the known optical energy characteristics. The processor 312 can then determine whether there is a match between the optical energy characteristics for the return optical energy 220 and/or 222 and the known optical energy characteristics for any materials in the database. Note that a "match" here can refer to optical energy characteristics that exactly match or to optical energy characteristics that are similar to one another within some specific tolerance or threshold (such as 1%, 2%, or 5%). The use of a database of known optical energy characteristics for different materials may help to increase the detection probability for detecting certain materials or may help to reduce false positive or false negative alarms.

If the processor 312 detects the presence of at least one specific combination of materials via Raman, derivative, or other spectroscopy (such as a combination of polyethylene and silicon), the processor 312 may take any suitable action(s), and the performed action or actions can vary based on the implementation of the material sensor 106. For example, the processor 312 may generate and transmit at least one notification to personnel identifying the detected material combination or the type of device that may include the detected material combination, such as via a physical or wireless communication interface 316. The notification may take any suitable form, such as an image of the space 102 being scanned and the identified location(s) of the detected material combination(s) or device type(s). The communications interface 316 supports communications with other systems or devices, such as by using a network interface card or a wireless transceiver facilitating communications over a wired or wireless network. The communications interface 316 may support communications through any suitable physical or wireless communication link(s). As another example, the processor 312 may generate and present a notification identifying detected material combinations/device types or warnings, alerts, or other content based on the detected material combinations/device types on a display 318. For instance, the display 318 may present an icon identifying a detected material combination or a device type. Note, however, that the results of the detection of a material combination may be used in any other suitable manner.

Although FIG. 3 illustrates one example of a material sensor 106 for detecting polyethylene and silicon or other material combinations, various changes may be made to FIG. 3. For example, various components in FIG. 3 may be combined, further subdivided, rearranged, replicated, or omitted and additional components may be added according to particular needs. Also, as noted above, the components of FIG. 3 may be distributed across multiple vehicles or other devices or replicated in multiple vehicles or other devices in order to support multi-device sensing of materials in an environment.

FIGS. 4A through 4D illustrate other example systems for carrying or otherwise implementing at least one material sensor for detecting polyethylene and silicon or other material combinations used in motion sensors or other devices in accordance with this disclosure. As noted above, at least one material sensor 106 in FIG. 1 is shown as being carried on a UAV (namely a drone in that example, although other UAVs may be used). However, at least one material sensor 106 may be used in various other ways.

Figure 4A:
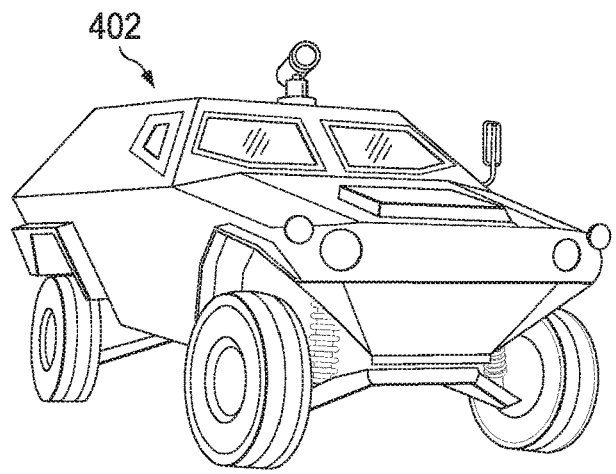
FIGS. 4A through 4D illustrate other example systems for carrying or otherwise implementing at least one material sensor for detecting polyethylene and silicon or other material combinations used in motion sensors or other devices in accordance with this disclosure.
Figure 4B:
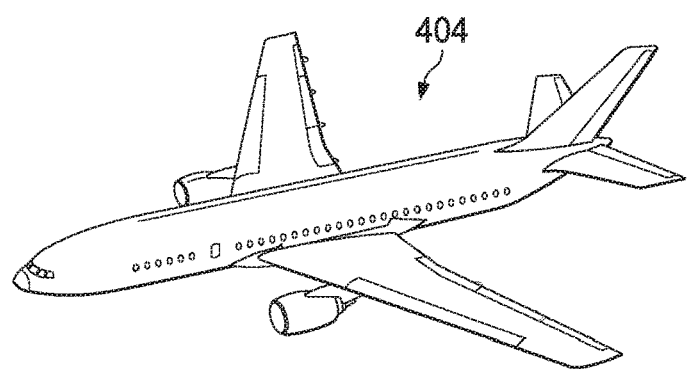

In FIG. 4A, a ground vehicle 402 may include at least one material sensor 106, such as when the at least one material sensor 106 is mounted to a front or top of the ground vehicle 402. The ground vehicle 402 here may use the at least one material sensor 106 to detect motion sensors or other devices in front of or near the ground vehicle 402. In FIG. 4B, a flight vehicle 404 (such as an airplane) may include at least one material sensor 106, such as when the at least one material sensor 106 is positioned in a nose or underneath the flight vehicle 404. The flight vehicle 404 here may use the at least one material sensor 106 to detect motion sensors or other devices below the flight vehicle 404.

Figure 4C:
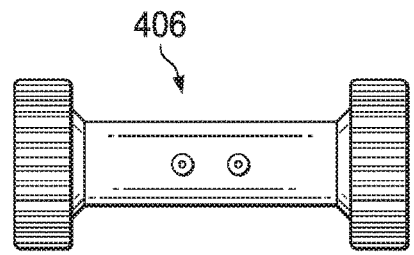

In FIG. 4C, a robotic vehicle 406 may be used for surveillance, reconnaissance, or other functions. For example, personnel may throw or otherwise place the robotic vehicle 406 in a building or other location and use a remote control to move the robotic vehicle 406 around the building or other location. The robotic vehicle 406 may include at least one material sensor 106, such as within a central portion of the robotic vehicle 406. The at least one material sensor 106 may be used to scan in front of, to the side(s) of, or behind the robotic vehicle 406 in order to detect motion sensors or other devices near the robotic vehicle 406.

Figure 4D:
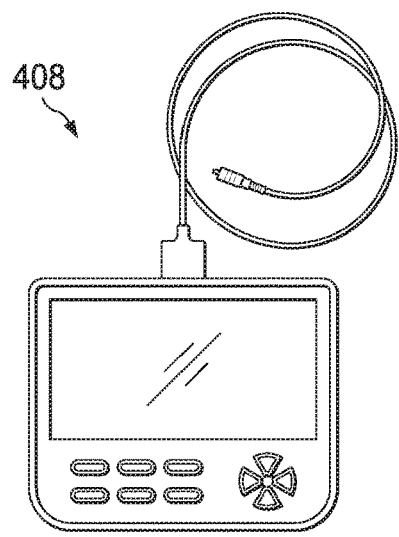

In FIG. 4D, a handheld tool 408 may be used for surveillance, reconnaissance, or other functions. For example, personnel may slide a fiber optic cable of the handheld tool 408 under a door or through a window or otherwise maneuver the fiber optic cable into a desired position to scan a given space. The handheld tool 408 may include at least one material sensor 106, such as within a main body of the handheld tool 408. Optical energy can be transmitted and received via the fiber optic cable, and the at least one material sensor 106 can detect motion sensors or other devices in a direction in which the fiber optic cable is pointed.

Although FIGS. 4A through 4D illustrate other examples of systems for carrying or otherwise implementing at least one material sensor for detecting polyethylene and silicon or other material combinations used in motion sensors or other devices, various changes may be made to FIGS. 4A through 4D. For example, land vehicles, flight vehicles, robotic vehicles, and handheld tools can come in a wide variety of configurations, and these figures do not limit the use of the at least one material sensor 106. The at least one material sensor 106 may be used in any other suitable manner.

Figure 5:
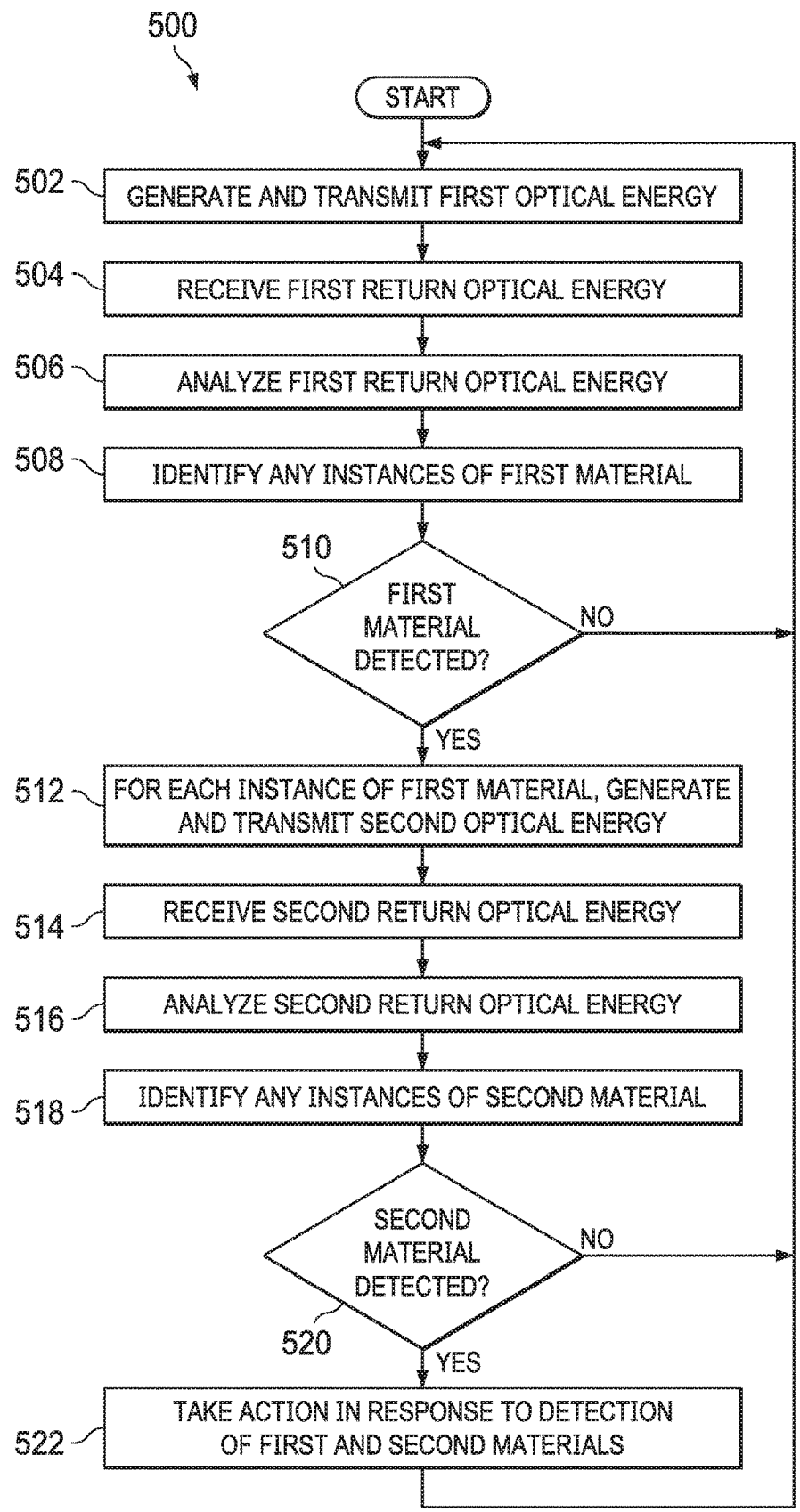
FIG. 5 illustrates an example method for detecting a material combination used in motion sensors or other devices in accordance with this disclosure.

FIG. 5 illustrates an example method 500 for detecting a material combination (such as polyethylene and silicon) used in motion sensors or other devices in accordance with this disclosure. For ease of explanation, the method 500 shown in FIG. 5 is described as being used by the material sensor 106 of FIG. 3 in the environment 100 of FIG. 1 to detect the motion sensor 200 of FIG. 2. However, the method 500 may involve the use of any other suitable material sensor designed in accordance with this disclosure, and the method 500 may be used in any other suitable environment and to detect any other suitable materials.

As shown in FIG. 5, first optical energy is generated and transmitted towards a space being scanned at step 502. This may include, for example, the optical source 302 (or one of the optical sources 302) generating a mid-infrared wavelength optical signal or other optical signal. This may also include the optical source 302 (or one of the optical sources 302), the interference filter 304, or other mechanism modulating the optical signal. The optical signal is transmitted towards an object or other portion of the space 102 as the optical energy 108.

First return optical energy is received from the space being scanned at step 504. This may include, for example, the receiver 308 receiving the return optical energy 220 from the object or other portion of the space 102 being scanned. In some cases, the return optical energy 220 may include at least one Raman signature of the material(s) illuminated using the optical energy 108 or at least one signal that is proportional to a derivative (such as a first derivative) of the reflectance and transmission properties of the material(s) illuminated using the optical energy 108.

The first return optical energy is analyzed at step 506, and any instances of a first material detected in the space being scanned are identified at step 508. This may include, for example, the processor 312 identifying one or more characteristics of the return optical energy 220, such as its spectrum. This may also include the processor 312 using the identified characteristic(s) of the return optical energy 220 to perform Raman, derivative, or other spectroscopic identification of the material(s) that provided the return optical energy 220. As a particular example, this may include the processor 312 comparing the spectrum of the return optical energy 220 with one or more spectra of one or more known materials stored in a database to identify the material(s) that provided the return optical energy 220. If the processor 312 here is only attempting to identify whether a single first material or a limited number of first materials are present, the processor 312 may only compare the spectrum of the return optical energy 220 with one or a limited number of spectra of known materials stored in the database. In some cases, this may involve the processor 312 determining whether any instances of a covering material (such as polyethylene) have been detected.

A determination is made whether any instances of the first material have been identified at step 510. If not, the process can return to step 502 to scan a different space 102 or a different portion of the same space 102. If at least one instance of the first material is detected, for each detected instance of the first material, second optical energy is generated and transmitted towards the portion of the space where the instance of the first material was detected at step 512. This may include, for example, the optical source 302 (or one of the optical sources 302) generating a visible or ultraviolet optical signal or other optical signal. This may also include the optical source 302 (or one of the optical sources 302), the interference filter 304, or other mechanism modulating the optical signal. The optical signal is transmitted towards the space where the instance of the first material was detected as the optical energy 110.

Second return optical energy is received from the space being scanned at step 514. This may include, for example, the receiver 308 receiving the return optical energy 222 from the object or other portion of the space 102 being scanned. In some cases, the return optical energy 222 may include at least one Raman signature of the material(s) illuminated using the optical energy 110 or at least one signal that is proportional to a derivative (such as a first derivative) of the reflectance and transmission properties of the material(s) illuminated using the optical energy 110.

The second return optical energy is analyzed at step 516, and any instances of a second material detected in the space being scanned are identified at step 518. This may include, for example, the processor 312 identifying one or more characteristics of the return optical energy 222, such as its spectrum. This may also include the processor 312 using the identified characteristic(s) of the return optical energy 222 to perform Raman, derivative, or other spectroscopic identification of the material(s) that provided the return optical energy 222. As a particular example, this may include the processor 312 comparing the spectrum of the return optical energy 222 with one or more spectra of one or more known materials stored in a database to identify the material(s) that provided the return optical energy 222. If the processor 312 here is only attempting to identify whether a single second material or a limited number of second materials are present, the processor 312 may only compare the spectrum of the return optical energy 222 with one or a limited number of spectra of known materials stored in the database. In some cases, this may involve the processor 312 determining whether any instances of a target material (such as silicon or silicon-based material) have been detected.

A determination is made whether any instances of the second material have been identified at step 520. If not, the process can return to step 502 to scan a different space 102 or a different portion of the same space 102. Otherwise, a location in the space being scanned has been determined to contain both the first and second materials, which may be indicative of the presence of a certain type of device (such as a motion sensor) at that location. As a result, one or more actions may occur in response to the detection of the first and second materials at step 522. This may include, for example, the processor 312 transmitting a notification identifying the detected material combination or device type to an external device or system, displaying an icon or other indicator associated with the detected material combination or device type, or taking other action.

Although FIG. 5 illustrates one example of a method 500 for detecting a material combination used in motion sensors or other devices, various changes may be made to FIG. 5. For example, while shown as a series of steps, various steps in FIG. 5 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    transmitting first optical energy towards a space being scanned;
    detecting one or more instances of a first material in the space using first return optical energy, the first return optical energy based on the transmitted first optical energy;
    for each of the one or more instances of the first material, transmitting second optical energy towards a portion of the space in which the instance of the first material was detected;
    detecting one or more instances of a second material in the space using second return optical energy, the second return optical energy based on the transmitted second optical energy; and
    identifying a presence of at least one type of device in the space based on at least one instance of the first material and at least one instance of the second material being detected at or near a common location in the space;
    wherein the at least one type of device comprises a motion sensor; and
    wherein wavelengths of the transmitted first optical energy and the transmitted second optical energy do not trigger sensing of motion by the motion sensor.

2. The method of claim 1, further comprising:
    modulating the first optical energy prior to transmitting the first optical energy; and
    modulating the second optical energy prior to transmitting the second optical energy.

3. The method of claim 2, wherein modulating the first optical energy and modulating the second optical energy comprise one of:
    modulating the first optical energy and the second optical energy using an interference filter; and
    modulating the first optical energy and the second optical energy using at least one tunable source of the first optical energy and the second optical energy.

4. The method of claim 1, wherein detecting the one or more instances of the first material and detecting the one or more instances of the second material comprise using Raman or derivative spectroscopy.

5. The method of claim 1, wherein detecting the one or more instances of the first material and detecting the one or more instances of the second material comprise comparing one or more characteristics of the first return optical energy or the second return optical energy to a database of known characteristics of known materials.

6. The method of claim 1, wherein:
    the first material comprises polyethylene; and
    the second material comprises silicon.

7. The method of claim 1, wherein at least one of (i) the transmission of the first optical energy and the second optical energy and (ii) the detection of the one or more instances of the first material and the one or more instances of the second material involves the use of multiple vehicles, different ones of the vehicles carrying different transmitting or receiving components.

8. A method comprising:
    transmitting first optical energy towards a space being scanned;
    detecting one or more instances of a first material in the space using first return optical energy, the first return optical energy based on the transmitted first optical energy;
    for each of the one or more instances of the first material, transmitting second optical energy towards a portion of the space in which the instance of the first material was detected;

detecting one or more instances of a second material in the space using second return optical energy, the second return optical energy based on the transmitted second optical energy; and identifying a presence of at least one type of device in the space based on instances of the first and second materials detected in the space;

wherein:
the at least one type of device comprises a motion sensor;
the first material forms a lens of the motion sensor; and
the second material forms a window or detector of the motion sensor.

9. The method of claim 8, wherein wavelengths of the transmitted first optical energy and the transmitted second optical energy do not trigger sensing of motion by the motion sensor.

10. A system comprising:
at least one optical source configured to generate first optical energy for transmission towards a space being scanned;
at least one receiver configured to receive first return optical energy, the first return optical energy based on the transmitted first optical energy; and
at least one processor configured to detect one or more instances of a first material in the space using the first return optical energy;
wherein, for each of the one or more instances of the first material, the at least one optical source is configured to generate second optical energy for transmission towards a portion of the space in which the instance of the first material was detected;
wherein the at least one receiver is configured to receive second return optical energy, the second return optical energy based on the transmitted second optical energy;
wherein the system further comprises an interference filter configured to modulate the first optical energy prior to transmission and to modulate the second optical energy prior to transmission; and
wherein the at least one processor is configured to:
detect one or more instances of a second material in the space using second return optical energy; and
identify a presence of at least one type of device in the space based on at least one instance of the first material and at least one instance of the second material being detected at or near a common location in the space.

11. The system of claim 10, wherein, to detect the one or more instances of the first material and detect the one or more instances of the second material, the at least one processor is configured to use Raman or derivative spectroscopy.

12. The system of claim 10, wherein, to detect the one or more instances of the first material and detect the one or more instances of the second material, the at least one processor is configured to compare one or more characteristics of the first return optical energy or the second return optical energy to a database of known characteristics of known materials.

13. A system comprising:
at least one optical source configured to generate first optical energy for transmission towards a space being scanned;
at least one receiver configured to receive first return optical energy, the first return optical energy based on the transmitted first optical energy; and
at least one processor configured to detect one or more instances of a first material in the space using the first return optical energy;
wherein, for each of the one or more instances of the first material, the at least one optical source is configured to generate second optical energy for transmission towards a portion of the space in which the instance of the first material was detected;
wherein the at least one receiver is configured to receive second return optical energy, the second return optical energy based on the transmitted second optical energy;
wherein the at least one processor is configured to:
detect one or more instances of a second material in the space using second return optical energy; and
identify a presence of at least one type of device in the space based on instances of the first and second materials detected in the space; and
wherein the at least one processor is configured to detect a motion sensor in the space based on a detected presence of polyethylene and silicon in the space.

14. The system of claim 13, further comprising:
an interference filter configured to modulate the first optical energy prior to transmission and to modulate the second optical energy prior to transmission.

15. The system of claim 13, wherein the at least one optical source comprises at least one tunable optical source configured to modulate the first optical energy and the second optical energy.

16. A non-transitory computer readable medium comprising instructions that when executed cause at least one processor to:
initiate transmission of first optical energy towards a space being scanned;
detect one or more instances of a first material in the space using first return optical energy, the first return optical energy based on the transmitted first optical energy;
for each of the one or more instances of the first material, initiate transmission of second optical energy towards a portion of the space in which the instance of the first material was detected;
detect one or more instances of a second material in the space using second return optical energy, the second return optical energy based on the transmitted second optical energy; and
identify a presence of at least one type of device in the space based on at least one instance of the first material and at least one instance of the second material being detected at or near a common location in the space;
wherein the at least one type of device comprises a motion sensor; and
wherein the instructions that when executed cause the at least one processor to identify the presence of the at least one type of device comprise:
instructions that when executed cause the at least one processor to identify the presence of the motion sensor based on detection of materials forming different components of the motion sensor.

17. The non-transitory computer readable medium of claim 16, further containing instructions that when executed cause the at least one processor to control modulation of the first optical energy prior to transmission and control modulation of the second optical energy prior to transmission.

18. The non-transitory computer readable medium of claim 16, wherein the instructions that when executed cause the at least one processor to detect the one or more instances of the first material and detect the one or more instances of the second material comprise:

instructions that when executed cause the at least one processor to use Raman or derivative spectroscopy.

19. The non-transitory computer readable medium of claim 16, wherein the instructions that when executed cause the at least one processor to detect the one or more instances of the first material and detect the one or more instances of the second material comprise:
    instructions that when executed cause the at least one processor to compare one or more characteristics of the first return optical energy or the second return optical energy to a database of known characteristics of known materials.

20. The non-transitory computer readable medium of claim 16, wherein the instructions that when executed cause the at least one processor to identify the presence of the at least one type of device comprise:
    instructions that when executed cause the at least one processor to identify the presence of the motion sensor in the space based on a detected presence of polyethylene and silicon in the space.

21. The non-transitory computer readable medium of claim 20, further containing instructions that when executed cause the at least one processor to generate a notification identifying the presence of the motion sensor in the space.

* * * * *